UNITED STATES PATENT OFFICE.

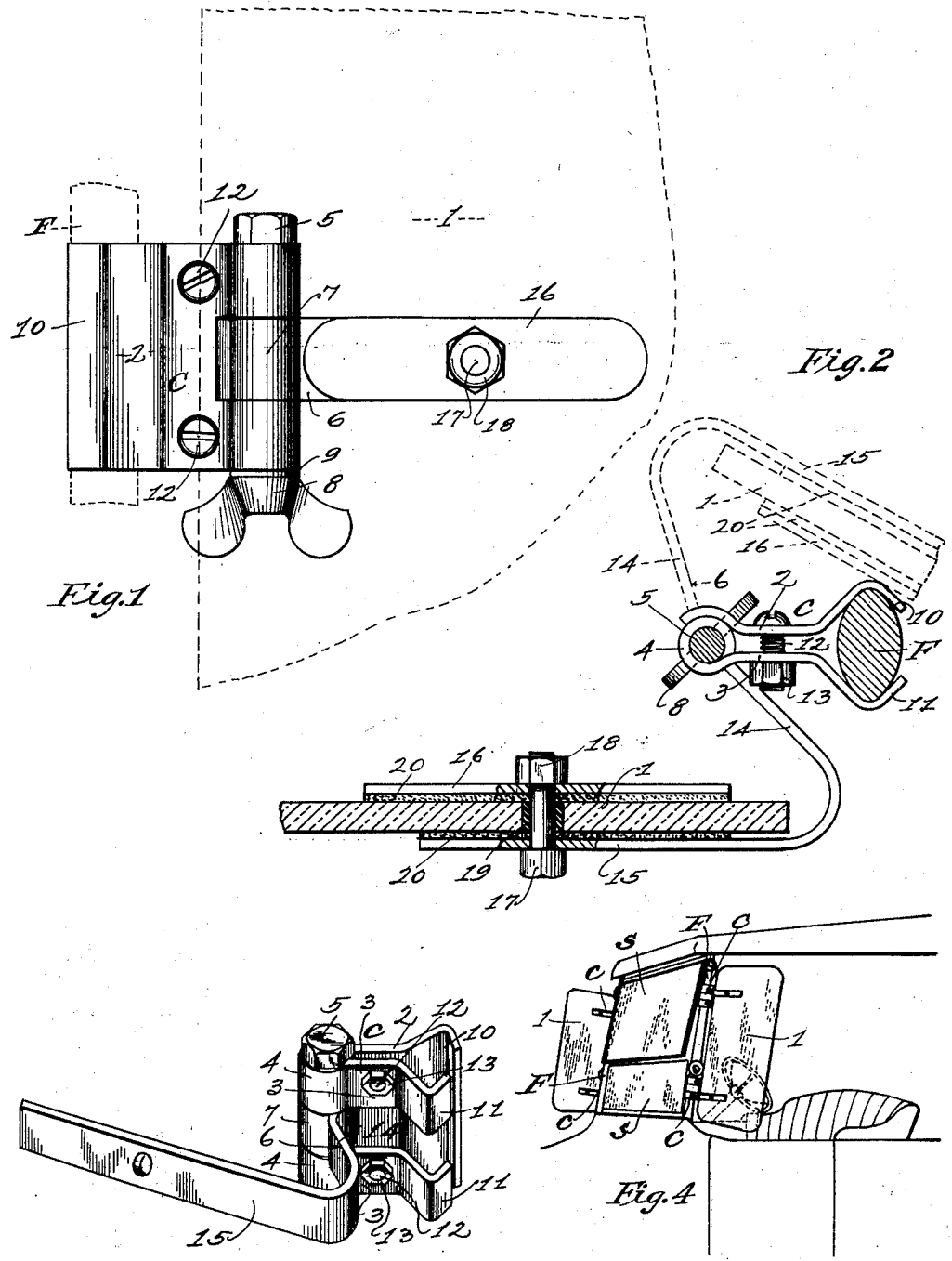

THOMAS B. POWELL AND CHARLES S. McLEAN, OF LONG BEACH, CALIFORNIA, ASSIGNORS, BY MESNE ASSIGNMENTS, TO THOMAS O. OSBORN, OF LOS ANGELES, CALIFORNIA.

AUXILIARY WINDSHIELD FOR VEHICLES.

1,400,979. Specification of Letters Patent. Patented Dec. 20, 1921.

Application filed August 27, 1919. Serial No. 321,981.

*To all whom it may concern:*

Be it known that we, THOMAS B. POWELL and CHARLES S. MCLEAN, citizens of the United States, and residents of Long Beach, in the county of Los Angeles and State of California, have invented new and useful Improvements in Auxiliary Windshields for Vehicles, of which the following is a specification.

The object of the present invention is to provide improvements in structure over the form of device shown and described in our previous application for patent for windshields of this character, filed May 5, 1919, Serial No. 294,964.

Another object of this invention is to provide an improved means for attaching and supporting the windshields to the main windshields, said means being so arranged that the auxiliary shields may be swung from their normal position at the rear of the main windshield to a position in front of said main shields. Other objects may appear as the description progresses.

Referring to the drawings forming a part of this application:

Figure 1 is a front side elevation of one of our improved windshield supports, with the shield shown in broken lines thereon;

Fig. 2 is a plan of the same shown in connection with the main windshield frame;

Fig. 3 is a perspective view of the same;

Fig. 4 is a perspective view of a portion of an automobile with our auxiliary shields attached thereto.

Similar characters of reference are employed in the specification and throughout the several views of the drawings for indicating the same and like parts.

Referring particularly to Fig. 4, it will be observed that our auxiliary shields 1, 1, are adapted for use at the ends of the main shields S, S, and are adapted to be adjustably attached to the main shield frame F, by means of clamps C, C; the arrangement of the shields being such that they may be swung into selected positions at the rear, front or sides of the main shields S, S, so as to deflect the air currents set up by the movement of the vehicle into or away from the interior of the car.

Clamps C, C, are composed of solid members 2, 2, spaced members 3, 3, having loops 4, 4, formed at one of their ends for receiving bolts 5, and shield holding members 6 having loops 7, at one of their ends also for receiving bolts 5, member 6 being interposed between members 3, 3. Wing nuts 8, and washers 9 are provided on the ends of bolts 5 for tightening the several members of the clamps together in order that the shields may be held at selected positions.

The outer portions 10 and 11, respectively, of members 2 and 3 are suitably bent so as to engage the frame F, of the main shield S, the portions 10 and 11 of said members engaging opposite portions of said frame members. Bolts 12, 12, are provided for extension through members 2 and 3 and for holding the same on frame F when the nuts 13, 13, thereon are tightened.

Shield holding members 6 are extended radially as at 14, from the axis of the bolts 12 and are thence bent outwardly as at 15, at an acute angle from portion 14, as shown in Figs. 2 and 3. The shields 1, 1, are held between the members 6 and elongated plates 16 and are supported thereon by means of bolts 17 having nuts 18 thereon. Bolts 17, it will be observed, extend through suitable holes in the glass shields 1, 1, and bushings 19 of suitable material, such as fiber, are provided for said holes around said bolts so that shock and jar to the glass due to the operation of the vehicle may be prevented. For the same purpose, the portions 15 of members 6 and the plates 16 are provided with pads 20 of felt or the like on the surfaces adjacent to the glass shields 1, 1.

The main purpose of shields of the character described being to deflect the air currents set by the movement of the vehicle outwardly from the vehicle, it will be obvious that when the shields 1, 1, are held at an angle rearwardly of the main shields S, S, and the supporting arms 6, 6, therefor engage the rear portions of the frame F of the main shields at the radial portions 14, the objects of our invention will be best accomplished. Likewise, when the shields 1, 1, are disposed at an angle forward of the shields S, S, the currents of air will be directed into the car through the spaces between the shields 1, 1, and S, S. Also it may be convenient or necessary at times to advance the shields 1, 1, as indicated by broken lines in Fig. 2, and the members 6, 6, are so formed that the shields may be moved around in front of the main shields thus affording a maximum clearance at the rear of the main shields for entry to and exit from the body of the car.

It will be noted that the members 2 and 3 are fixed in their relation to the frame members F, F, of the automobile and all of the adjustment of the shields 1, 1, is accomplished by means of the form and arrangement of members 6, 6, and this is a particular feature of our invention and obviates the double adjustment which is necessary in other types of auxiliary windshields. It will also be noted that there is no physical connection between the pair of attaching clamps of each shield, such as is shown in our former application for patent, hereinbefore mentioned. Therefore, the use of our improved attaching means renders the car using the same sightly and all parts which obscure the vision of the operator are eliminated.

What we claim is:

1. In combination with a main windshield of a vehicle, an auxiliary windshield, a shield holding member fixed to said auxiliary shield, a clamp for securing said shield holding member to said main windshield, said clamp comprising a single rectangular piece of metal formed with a longitudinal slot through a part of its length and bent upon itself to provide a single solid member and a pair of spaced members extending substantially parallel with said solid member, said piece of metal bent to encompass a bolt at its bent end, all of said members formed with bent outer ends adapted to be drawn together to engage the frame of the main windshield, screws adapted to draw said spaced members toward said solid member, a bolt passing between said spaced members and said single member; said shield holding member looped around said bolt intermediate of said spaced members; and a nut on said bolt adapted on being advanced on said bolt to press said spaced members together to lock said shield holding member against turning.

2. In combination with a main windshield and an auxiliary windshield for vehicles, a single rectangular sheet of metal formed with a longitudinal slot extending through part of its length, said sheet bent upon itself to provide a bolt-receiving space and to provide a single solid member and a pair of spaced members, the outer ends of the three members being bent to clamp a main windshield frame, a bolt passing through said bolt receiving space, screws for drawing said spaced members toward said single member, a curved shield holding member looped around said bolt intermediate of said spaced members, and a nut on the end of said bolt adapted to be advanced thereon to press said spaced members together to engage said looped end of said shield support whereby said shield support is locked against turning.

3. In combination with a main windshield frame and an auxiliary windshield, a shield support adapted to be secured to said auxiliary shield, a bolt, said shield support having one end looped around said bolt, a single rectangular sheet of metal formed with a longitudinal slot extending part way through its length, said slotted sheet bent midway of its ends to partially encompass said bolt and to provide a single projecting member and a pair of spaced projecting members extending substantially parallel with said single member, all of said members bent at their forward ends to engage a windshield frame, screws adapted to draw said spaced members toward said single member, to cause the bent ends of said members to clamp said main windshield frame, and a nut on the end of said bolt, whereby screwing the nut downward on the said bolt will draw said spaced members toward each other to engage said looped end of said shield support to hold it against turning.

Signed at Los Angeles, in the county of Los Angeles, and State of California, this 15th day of August, 1919.

THOMAS B. POWELL.
CHARLES S. McLEAN.

In presence of—
M. E. CANFIELD,
LUTHER L. MACK.